United States Patent [19]
Röper

[11] Patent Number: 5,722,351
[45] Date of Patent: Mar. 3, 1998

[54] APPARATUS FOR SECURING MOVABLE THINGS, PARTICULARLY DOGS

[75] Inventor: Brigitte Christiane Röper, Hamburg, Germany

[73] Assignee: Systec Ausbausysteme GmbH, Puchheim, Germany

[21] Appl. No.: 544,747

[22] Filed: Oct. 18, 1995

[30] Foreign Application Priority Data

| Oct. 18, 1994 | [DE] | Germany | 9416751 U |
| Nov. 8, 1994 | [DE] | Germany | 9417869 U |
| Dec. 19, 1994 | [DE] | Germany | 9420287 U |

[51] Int. Cl.⁶ .................................. A01K 27/00
[52] U.S. Cl. ........................................ 119/795
[58] Field of Search ........................ 119/795–799

[56] References Cited

U.S. PATENT DOCUMENTS

| 1,592,482 | 7/1926 | Falconer. |
| 2,108,402 | 2/1938 | Dennin. |
| 2,336,936 | 12/1943 | Johnson. |
| 3,552,535 | 1/1971 | Strang. |
| 4,433,787 | 2/1984 | Cook. |

FOREIGN PATENT DOCUMENTS

| 1 171 294 | 7/1984 | Canada. |
| 4 052796 | 2/1992 | Japan. |
| 134233 | 7/1929 | Switzerland. |

Primary Examiner—Thomas Price
Attorney, Agent, or Firm—Panitch Schwarze Jacobs & Nadel, P.C.

[57] ABSTRACT

A device is provided for securing movable things, in particular dogs, against unauthorized removal. A security lock is used which, after insertion of a deposit token, releases an additional lock with an accompanying key or only the key. This additional lock is connected to a restraining device in order to secure the movable thing, so that it is not able to be removed at anyones disposal.

12 Claims, 8 Drawing Sheets

APPARATUS FOR SECURING MOVABLE THINGS, PARTICULARLY DOGS

FIELD OF THE INVENTION

The invention concerns a device for securing movable things, in particular for leashing of dogs against unauthorized removal.

BACKGROUND OF THE INVENTION

In recent years the theft of dogs has increased tremendously. According to the statistics, five to six dogs are stolen each day in many large cities. Frequently, the theft occurs at the time when the dog is taken along on a shopping trip and has to wait for its owner in front of businesses in which it may not enter. In front of the business appropriate hitching rings, to which the dog can be leashed, provide no remedy for this problem since the thieves can easily unfasten the dog from the leash, while the owner is distracted by shopping in the store.

SUMMARY OF THE INVENTION

Starting from this background, an object of the present invention is to develop a security device which reliably prevents unauthorized removal of the dog. At the same time, this security device should be distinguished by a relatively simple operation and by sufficient freedom of movement for the secured dog. Also, but not least, it could provide an incentive for a visit to such businesses which offer their customers this security device.

Although in the framework of this application only the security of dogs is specifically discussed, it should be noted that the invention extends also to the securing of other movable things, in particular also to the securing of bicycles, baby carriages, etc.

The above-outlined object is achieved according to the invention, wherein a stationary or restricted movement security lock is provided which, after insertion of a deposit, releases a lock with a key or the like, capable of operating further for securing the movable thing, and wherein the lock is connected to a restraining means for bridging the distance between the security lock and the thing to be secured, and the deposit is returnable after restoring the lock and key to their original positions.

Therefore, the dog holder inserts a deposit token into the security lock, similar to the commonly coin-operated security locks on shopping carts, whereupon an additional lock is made accessible which is to be operated by a key or the like. However, this lock is not released totally, but is connected to a restraining means, whose other end is firmly mounted. This lock is locked with the help of its key to the thing to be secured, directly or by means of a loop structure formed with the restraining means, that is, either slipped around the neck of the dog or locked onto a part of the frame of the bicycle or of the baby carriage. Then the customer can remove the key and attend in peace to his/her shopping. Upon completion of the shopping, the lock can be opened again with a key, and the lock, together with the key located therein, is inserted back into the security lock. After the locking in the security lock again, the shopper receives the security token back.

It is particularly suitable, if the additional lock is a padlock or shackle lock, that is, it comprises a lock casing and a clamp moving opposite to it in the unlocked state, which in the locked state engages the lock casing and thereby tightly holds the dog or the thing to be secured and at the same time releases the key.

In combination therewith, it is advisable that the restraining means be in the form of a chain or a metal cable with several loops following one after the other. The lock with the restraining means can thereby be slipped directly around the neck of the dog or around a part the thing to be secured, and according to the desired diameter of the loop, the lock can be hooked into one of the links of the chain or into one of the loops and be locked there.

For releasing and locking the lock by means of the security lock upon insertion of a deposit token or upon return of the same to the user, the artisan is offered numerous possible embodiments. In particular, the coupling principle can be made use of, as it has in the meantime been thoroughly proven in security locks on shopping carts. Thus, for example, the lock can have a protruding locking part which is inserted into the security lock and is locked there, whereby the locking is engaged upon insertion of the deposit token and on return of the lock the deposit token is released again from the lock.

The locking of the lock in the security lock can occur such that the key belonging to the lock is also inaccessible. At the least, it must be ensured that this key cannot be removed without inserting a deposit token into the security lock.

Instead, it is also possible to furnish the key with a projection, which can be locked in the security lock and secure the lock only indirectly with the key, as in the type that in the locking position of the key its lock is also blocked against opening. In the simplest case, it is only necessary that the turning capacity of the key with respect to the lock be restricted by an appropriate blocking means.

If the coupling of the lock to the security lock is achieved directly through the lock itself, thereby corresponding to the first embodiment, the possibility also exists that the therementioned locking part is constructed as a spreader part, which serves to release the lock for locking with the restraining means upon formation of a loop. Of course, the lock can also be coupled by means of various locking parts to the security lock or on the restraining means.

Another alternative exists wherein, instead of the lock together with its key, only the key is released by the security lock, while the lock is freely accessible at the restraining means, but cannot be removed at just anyone's disposal. In this connection it is advisable to explain to the customer which lock belongs to which security lock, so that no mixups are caused when there are a number of security locks in front of the store. This correlation can be achieved whereby the restraining means is fastened with the lock directly to the corresponding security lock or whereby one places the same numbers or the like on both the security lock and its lock.

Finally, an alternative exists also whereby the security lock works together with a container opening by means of a locking part. The container accepts the lock connected to the restraining means together with its key, and the locking part can be locked by the security lock, in which is installed the lock or its key for the activation of the security lock. Thereby, just as in the aforementioned alternative, it is provided, that the key is able to be removed from the lock essentially only after its locking.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE PREFERRED EMBODIMENTS

Figure 1:
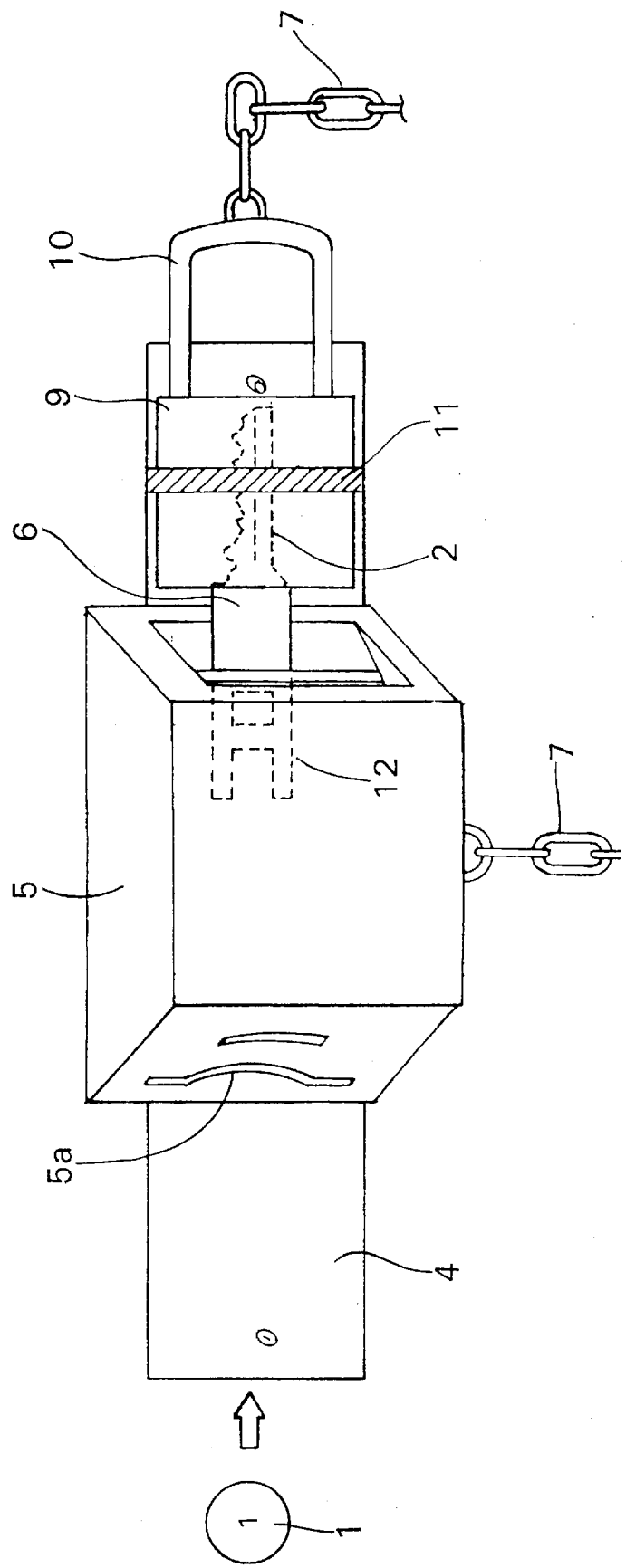
FIG. 1 shows the security system together with a padlock.

In FIG. 1 is shown a security lock 5, which by means of a base-plate 4 is mounted stationary against a wall or the like. Of course, the security lock 5 can also be displaceably mounted in a restricted manner along a rail.

The security lock 5 has a detachable chain 7, whose other end is non-detachably connected to a padlock 9. Into the lock 9 is inserted the key 6 necessary for its activation. This key 6, which is captured with its one end 2 in the lock 9, is constructed at its gripping area as a coupling element 12, of such a type that this coupling element 12 is able to lock in the security lock 5.

Moreover, as FIG. 1 shows, mounted on the base-plate 4 is a detent clip 11; which overlaps the lock 9 and in the uncoupled state of the lock prevents its twisting, so that it cannot be removed from the key 6 locked in the security lock.

Figure 2:
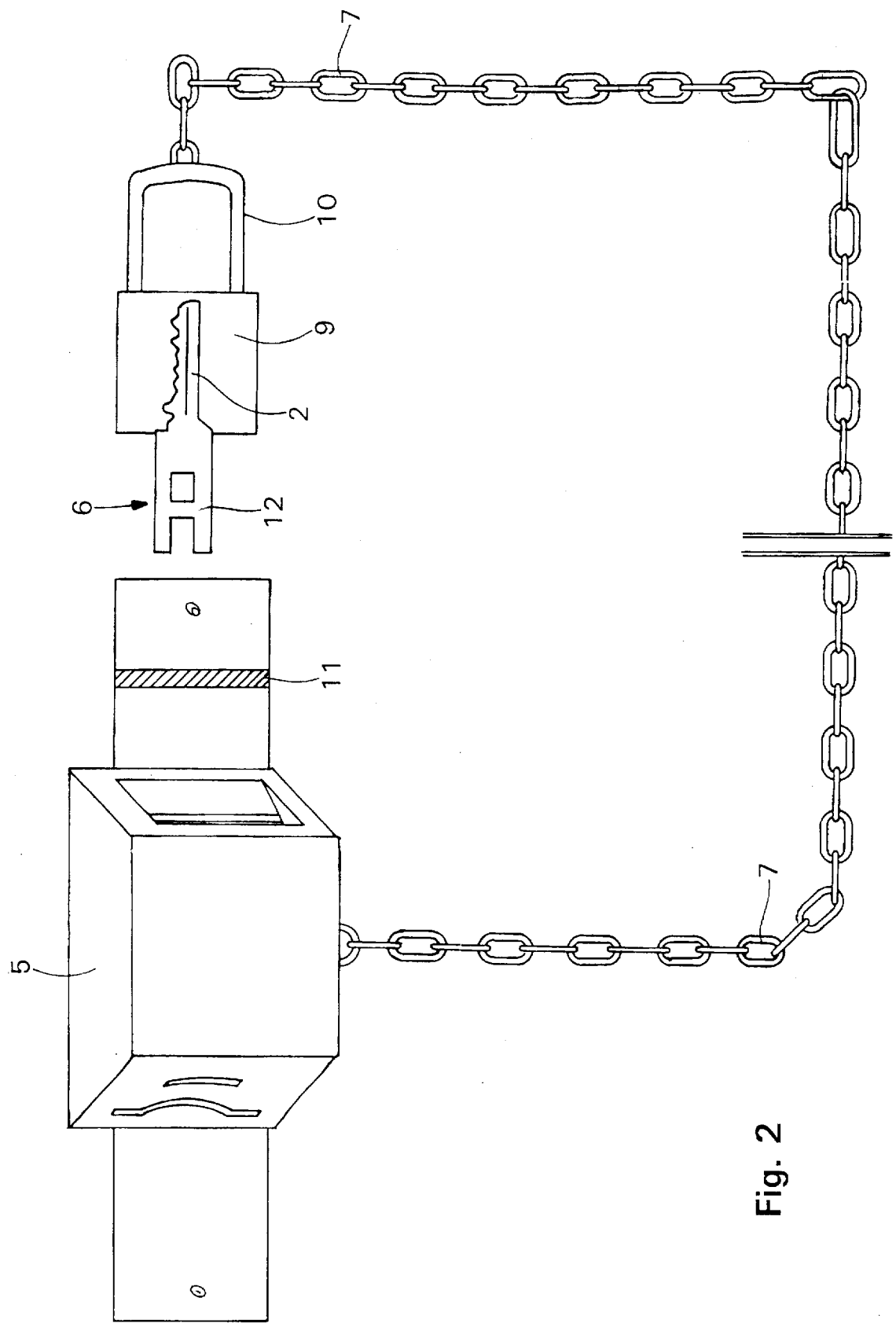
FIG. 2 shows the same system as FIG. 1 after insertion of the deposit token and releasing of the lock.

Inside of the security lock 5 is found a locking mechanism, like those known in principle with the security locks on shopping carts. That is, upon insertion of a deposit token 1 into the slot 5a of the security lock the locking of the key 6 is neutralized, so that the lock 9 together with the key 6 inserted in it is set free. This state is represented in FIG. 2.

Figure 3:
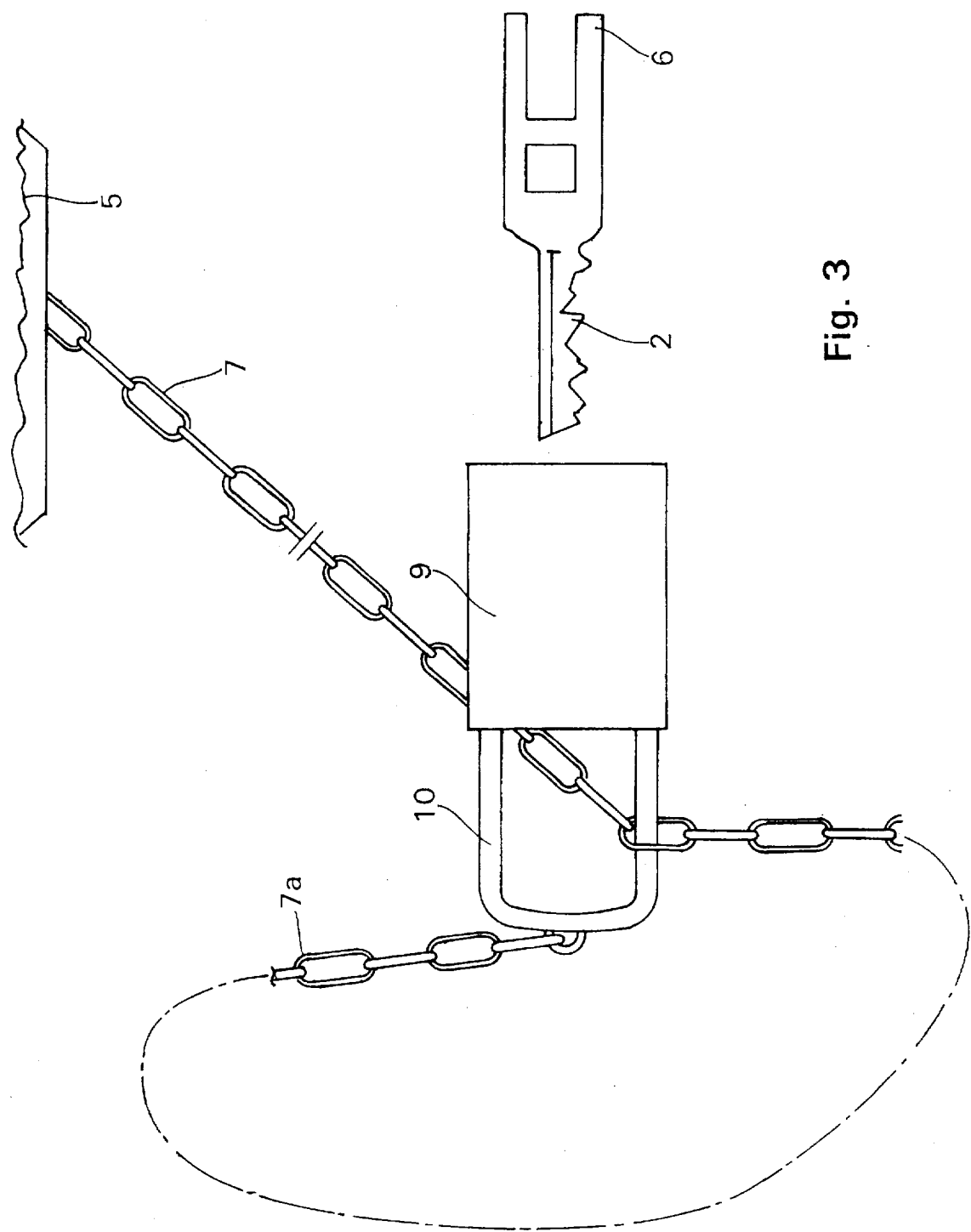
FIG. 3 shows locking of the lock for securing the movable thing against theft.

Now, since the lock 9 is no longer subject to a torsional blocking device, it can be operated with the help of key 6, that is opened and/or closed, so that its clasp 10 can be pulled out and suspended in one of the chain links of chain 7 for the formation of a loop 7a which can be placed fittingly around the neck of the dog to be secured. This state is represented in FIG. 3—without a dog. The user then presses the clasp 10 into the lock 9 again, locks the clip by activating the key 6 and removes the key, so that the dog is protected reliably against theft.

After completion of his/her shopping, the customer inserts the key 6 again into the lock 9, opening the clip 10, so that it can loosen the loop 7a and release the dog. Then he/she sticks the lock 9 together with the key 6 located its back into the security lock 5. As soon as the key 6 with its end 12 is duly inserted in the security lock 5, the key is automatically locked, and the security token 1 is given back. As already stated, the lock 9 is thereby held by the detent clip 11 in such a position relative to the key 6 that it cannot be removed from key 6.

Figure 4:
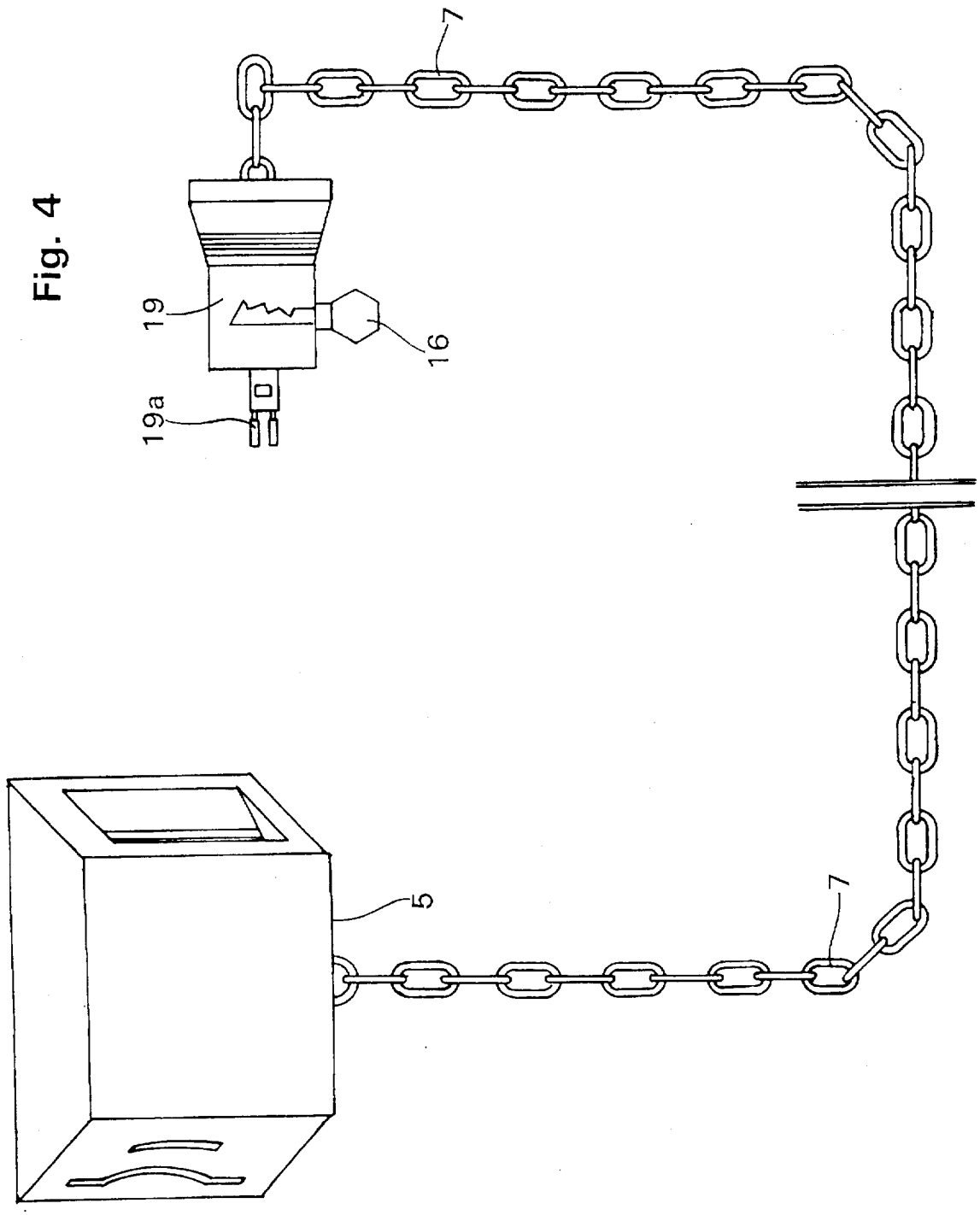
FIG. 4 shows a representation similar to FIG. 2 of another embodiment of the lock.
Figure 5:
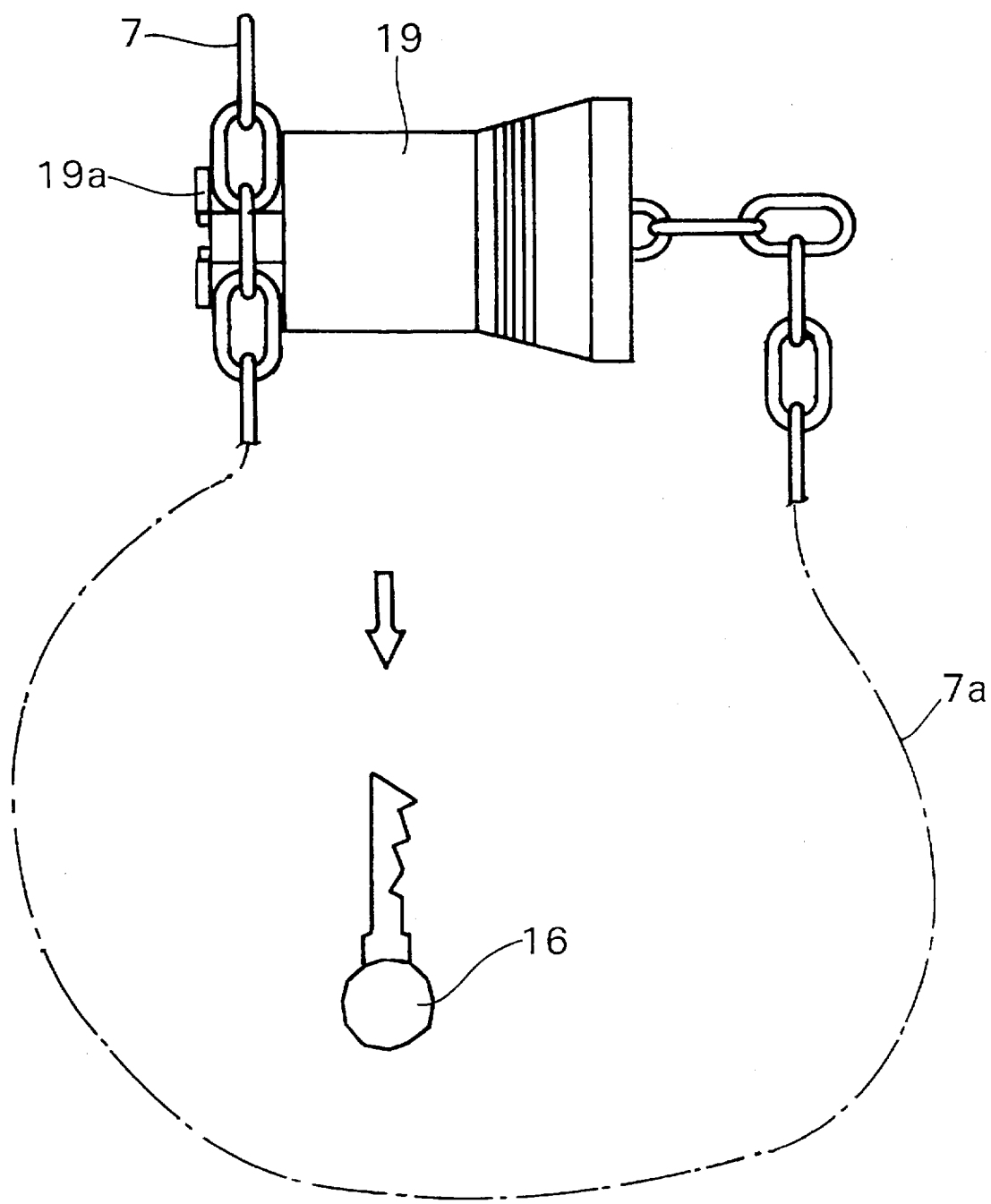
FIG. 5 a representation similar to FIG. 3 of the lock according to FIG. 4.

In FIGS. 4 and 5 a special lock 19 is used instead of the padlock 9. This lock 19 is not locked with its key but directly into the security lock 5. For this purpose, it has projecting locking parts 19a, which lock in the security lock 5 in the same manner as the locking part 12 of the key 6 of the previously described embodiment or are released upon insertion of a deposit token.

In addition, the locking parts 19a can be attached to the restraining means 7 with the help of the key 16 belonging to the lock 19 as represented in FIG. 5. For this purpose, a loop is formed at the end of the restraining means 7, and the locking parts 19a are inserted fittingly into a link of the restraining means 7 and locked into it in a form fitting manner with the help of the key 16—by spreading in the embodiment shown. The key 16 can be removed only after this locking of the locking parts 19a on the restraining means 7.

The opening of the loop and the reintroduction of the lock 19 into the security lock 5 occur in principle in the same way as shown in FIGS. 1 to 3. The only difference is that in the embodiment according to FIGS. 4 and 5 it must be ensured that the key 16 cannot be removed when lock 19 is locked in the security lock. This can be achieved in a simple way whereby the key 16 can be removed only when the locking parts 19a are not inserted in the coupling position in the security lock 5 but are found in the locking position on the restraining means 7 according to FIG. 5.

Figure 6:
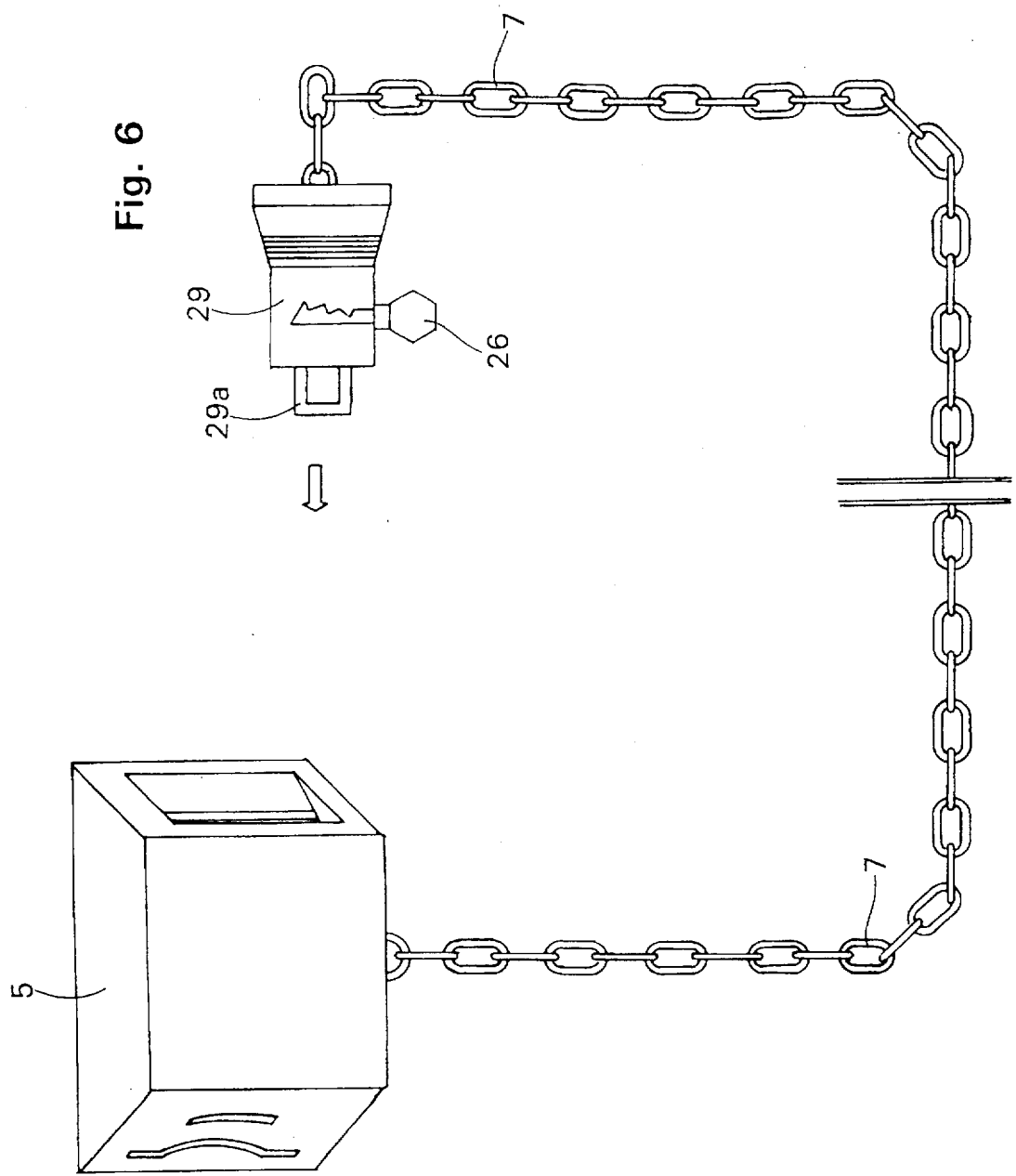
FIG. 6 is a representation similar to FIG. 2 of still another embodiment of the lock.
Figure 7:
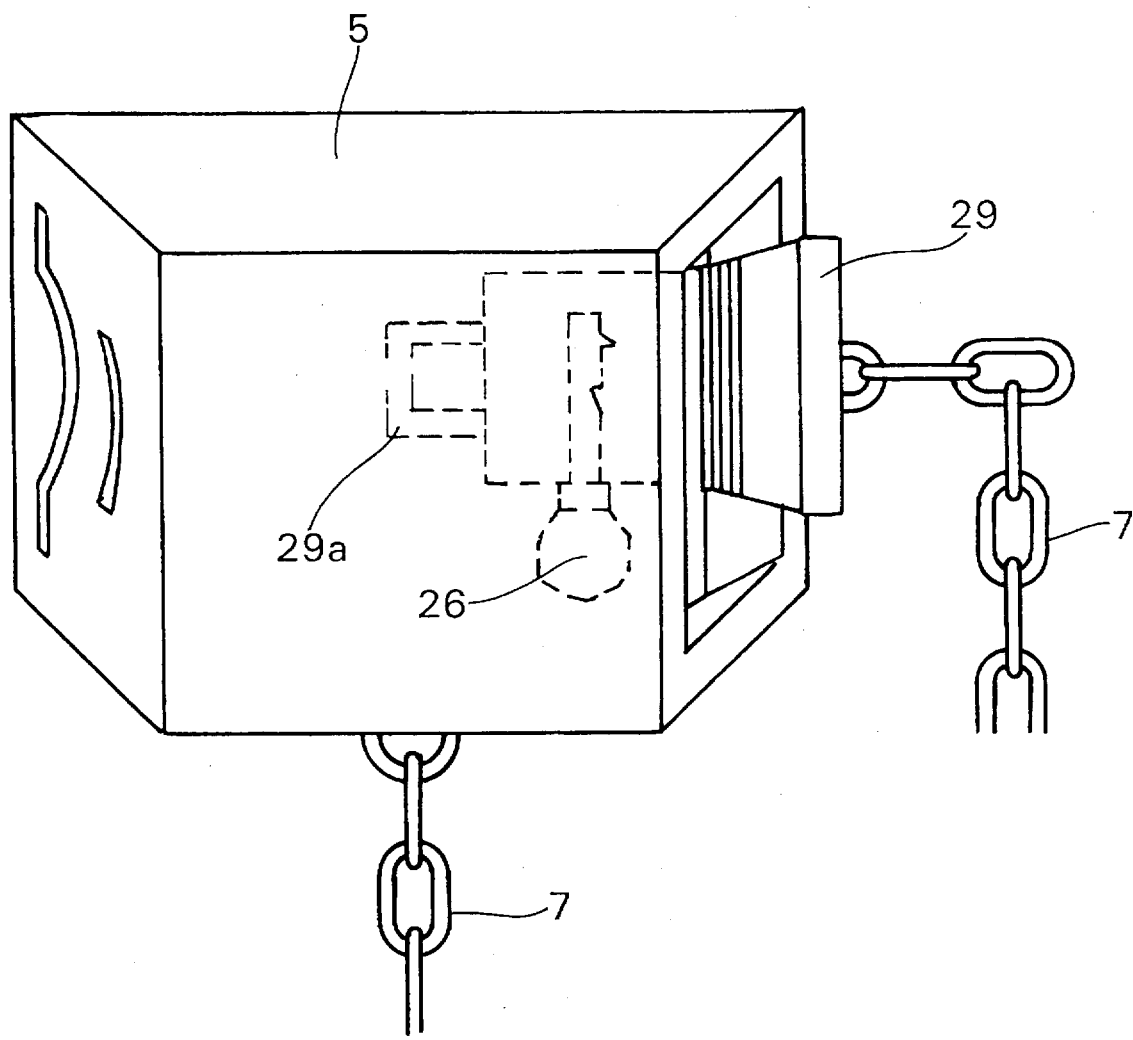
FIG. 7 is a representation similar to FIG. 5 of the lock according to FIG. 6.

FIG. 6 shows a similar design as in FIGS. 1 and 5. Here the lock 29 is constructed as a padlock similar to lock 9. However, its locking clasp 29a serves not only for fastening onto the chain 7 with the help of the key 26 but at the same time also for locking in the security lock 5. The locked state is shown in FIG. 7. One can also see there that the lock 29 is so deeply inserted into the security lock 5 that the key 26 is no longer accessible from the outside in any way. It is thereby ensured, that the deposit token return results only if and when the lock 29 is introduced together with its key 26 into the security lock.

Beside these, there are, of course, also other possible construction embodiments, perhaps in the form that the lock is connected with its chain, however without key for releasing at ones disposal and only the key operating together with the security lock.

Figure 8:
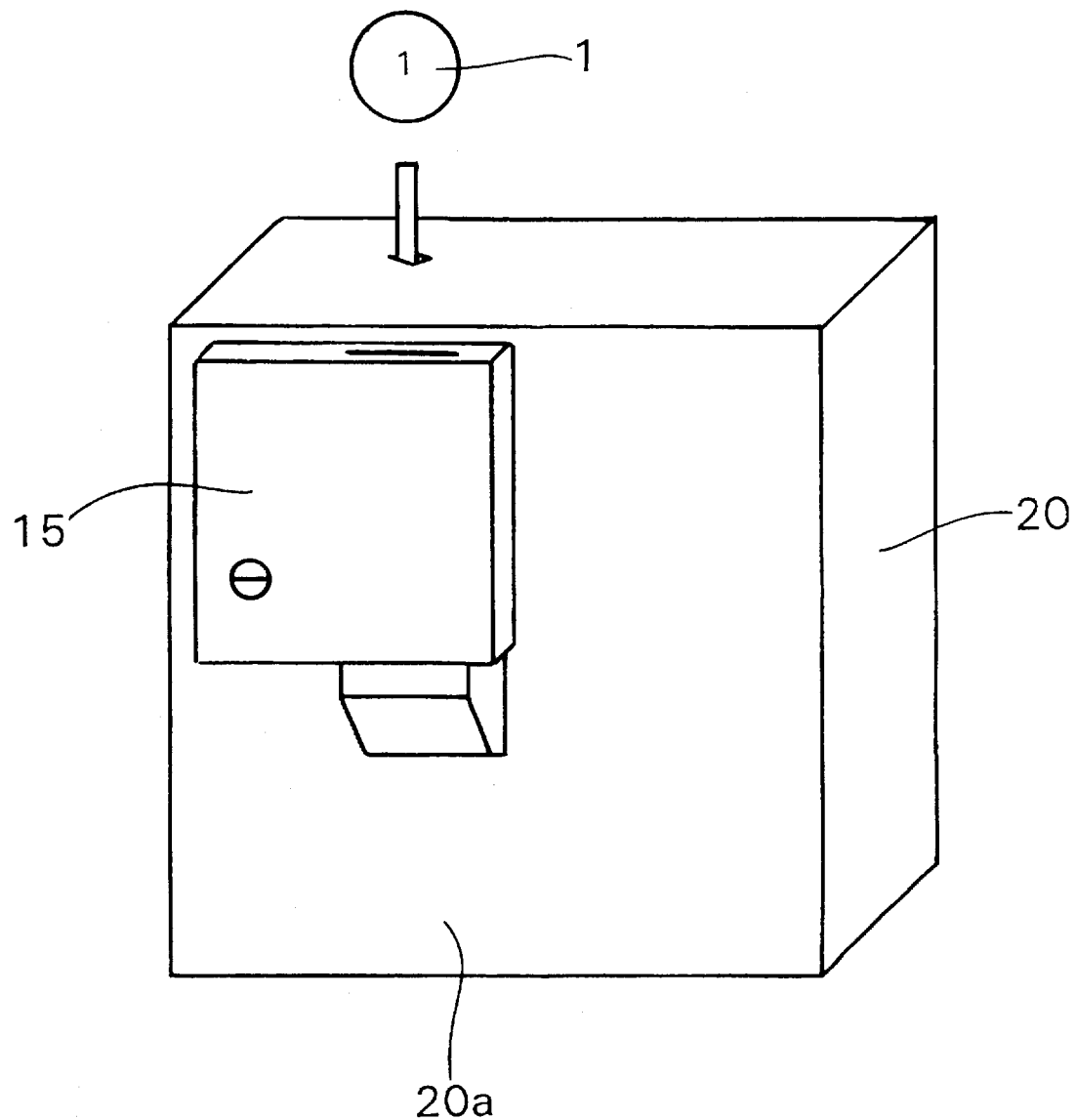
FIG. 8 shows an additional embodiment of the invention.

Finally, FIG. 8 shows still another embodiment which operates with a container 20. The inside of this container is accessible through a door 20a, which works together with a security lock 15. This security lock 15 allows the opening of the container only after insertion of a security token. From the container can then be withdrawn either a lock and key hanging on a chain or only the key alone, if the lock with its chain is located outside of the container. The closure of the door 20 and the return of the security token is only then possible, if, in the first-mentioned embodiment, the lock with its key, or in the second-mentioned embodiment, the key alone, has been returned to a special control position of the security lock. The possibility also exists thereby of locking the door 20a with the lock key, whereby the deposit token is released while at the same time barring the locking key against removal.

The control of the return of key or lock does not necessarily result absolutely by form-fitting coupling of the key and/or the lock to the security lock, but could also possibly be optical or inductive. This, of course, also applies for the additional afore-described designs. Also it lies within the scope of the invention, instead of the depicted key, to use chip cards or some other coded cards and the like.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. Apparatus for securing a movable thing against unauthorized removal, comprising a security lock (5, 15) having a slot adapted to receive a deposit token and an additional lock secured in a first position thereto, such that after insertion of the deposit token (1) the additional lock (9, 19, 29) is releasable from the first position, the additional lock having a key (6, 16, 26) removably located therein in a first position for operating the additional lock for securing the movable thing, and the additional lock being connected to a restraining means (7) which is also connected to the security lock, the deposit token (1) being adapted to be removed from the slot after the additional lock (9, 19, 29) and key (6, 16, 26) are returned to the first positions.

2. The apparatus according to claim 1, wherein the restraining means (7) is a chain having several loops arranged at intervals to each other.

3. The apparatus according to claim 1, wherein the restraining means (7) is a metal cable having several loops arranged at intervals to each other.

4. The apparatus according to claim 1, wherein the additional lock (9, 19, 29) comprises a lock casing having a clasp (10, 19a, 29a) attached thereto, which in an unlocked state is movable in opposition to the casing and in a locked state engages in the lock casing, fastens the movable thing relative to the restraining means (7), and releases the key (6, 16, 26).

5. An apparatus according to claim 1, wherein the additional lock (19, 29) has a projecting locking part (19a, 29a) attached thereto for locking into the security lock (5).

6. An apparatus according to claim 1, wherein the additional lock (9, 19, 29) and the key (6, 16, 26) are secured against removal when locked in the security lock (5).

7. An apparatus according to claim 1, wherein the key (6) includes a catch (12) which is secured to the security lock (5) when the additional lock is in the first position.

8. An apparatus according to claim 1, wherein at least one locking part (19a, 29a) is located on the additional lock (19, 29), which upon release of the additional lock from the first position serves for locking to the thing to be secured.

9. An apparatus according to claim 1, wherein the additional lock (19, 29) has at least one locking part (19a, 29a) located thereon, which upon release of the additional lock from the first position is adapted for locking with the restraining means (7) by formation of a loop.

10. An apparatus according to claim 1, wherein the security lock (15) is fastened to a container (20) which opens by means of a closure part (20a), the closure part (20a) being lockable by the security lock (15) and from which at least the key is removable, whereby the key cooperates with the security lock (15) in such a manner that after inserting the key into the container (20) the security lock releases the deposit token.

11. An apparatus according to claim 10, wherein the additional lock together with the key is removable from the container, and the security lock releases the deposit token after inserting both the key and the additional lock into the container.

12. An apparatus for securing a movable thing against unauthorized removal, comprising a security lock having a slot adapted to receive a deposit token, an additional lock connected to the security lock by restraining means, and a key for the additional lock secured to the security lock in a first position, such that after insertion of the deposit token the key is releasable from the first position for operating the additional lock for securing the movable thing, the deposit token being adapted to be removed from the slot after the key is returned to the first position.

* * * * *